15

US007307997B2

(12) United States Patent
Vinokurov et al.

(10) Patent No.: US 7,307,997 B2
(45) Date of Patent: Dec. 11, 2007

(54) DETECTION AND MITIGATION OF UNWANTED BULK CALLS (SPAM) IN VOIP NETWORKS

(75) Inventors: Dmitri Vinokurov, Ottawa (CA); Robert W. MacIntosh, Arnprior (CA)

(73) Assignee: Alcatel Lucent, Paris (FR)

( * ) Notice: Subject to any disclaimer, the term of this patent is extended or adjusted under 35 U.S.C. 154(b) by 796 days.

(21) Appl. No.: 10/849,830

(22) Filed: May 21, 2004

(65) Prior Publication Data

US 2005/0259667 A1 Nov. 24, 2005

(51) Int. Cl.
*H04L 12/28* (2006.01)
*H04L 12/56* (2006.01)
*H04M 15/00* (2006.01)
*H04M 7/00* (2006.01)
*H04M 1/56* (2006.01)
*H04M 15/06* (2006.01)

(52) U.S. Cl. ............ 370/401; 379/112.03; 379/142.06; 379/220.01

(58) Field of Classification Search ................ 370/401, 370/389, 229, 252, 469, 352; 379/189, 112.03, 379/93.17, 201.01, 220, 112; 709/224, 223, 709/206, 246, 207, 227; 715/810; 714/46, 714/43, 41; 707/10; 705/1, 26
See application file for complete search history.

(56) References Cited

U.S. PATENT DOCUMENTS 6,940,959 B1 * 9/2005 Eyre et al. ............. 379/142.06

2004/0131170 A1 * 7/2004 Wu ....................... 379/220.01
2004/0172265 A1 * 9/2004 Spragle et al. ................. 705/1
2005/0246344 A1 * 11/2005 Keller et al. .................. 707/10
2006/0168006 A1 * 7/2006 Shannon et al. ............ 709/206

OTHER PUBLICATIONS

BellSouth, Privacy Director Service, http://www.bellsouth.com/consumer/privacy_dir_info.html, 2002.
Peterson, J., A Privacy Mechanism for the Session Initiation Protocol (SIP), The Internet Society, Nov. 2002.
Camarillo, G., et al., Integrated Services Digital Network (ISDN) User Part (ISUP) to Session Initiation Protocol (SIP) Mapping, The Internet Society, Dec. 2002.

* cited by examiner

*Primary Examiner*—Wing Chan
*Assistant Examiner*—Prenell Jones
(74) *Attorney, Agent, or Firm*—Kramer & Amado, P.C.

(57) ABSTRACT

A technique for detecting SPAM calls in VoIP networks and taking responsive actions to such calls is described. Detection is based on recognizing abnormalities in signaling message statistics. For example, a device that persistently sends many more call setup requests then it receives and at the same time constantly receives too many, or too few, call terminations in a statistically determined period of time is assumed to be a spam source. This criteria is based on the principle that a Spammer originates many calls, which are consistently terminated by the Spammer or by the recipient. Responsive actions to the detection of VoIP spam may include displaying a call text warning to the recipient, using special ring tone, automated voice mail answer, rejecting the call, etc. The invention addresses an issue that will become more problematic for VoIP networks and their subscribers in the future, and to which a solution has not been proposed in the prior art.

12 Claims, 2 Drawing Sheets

Spam re-originated from the different location

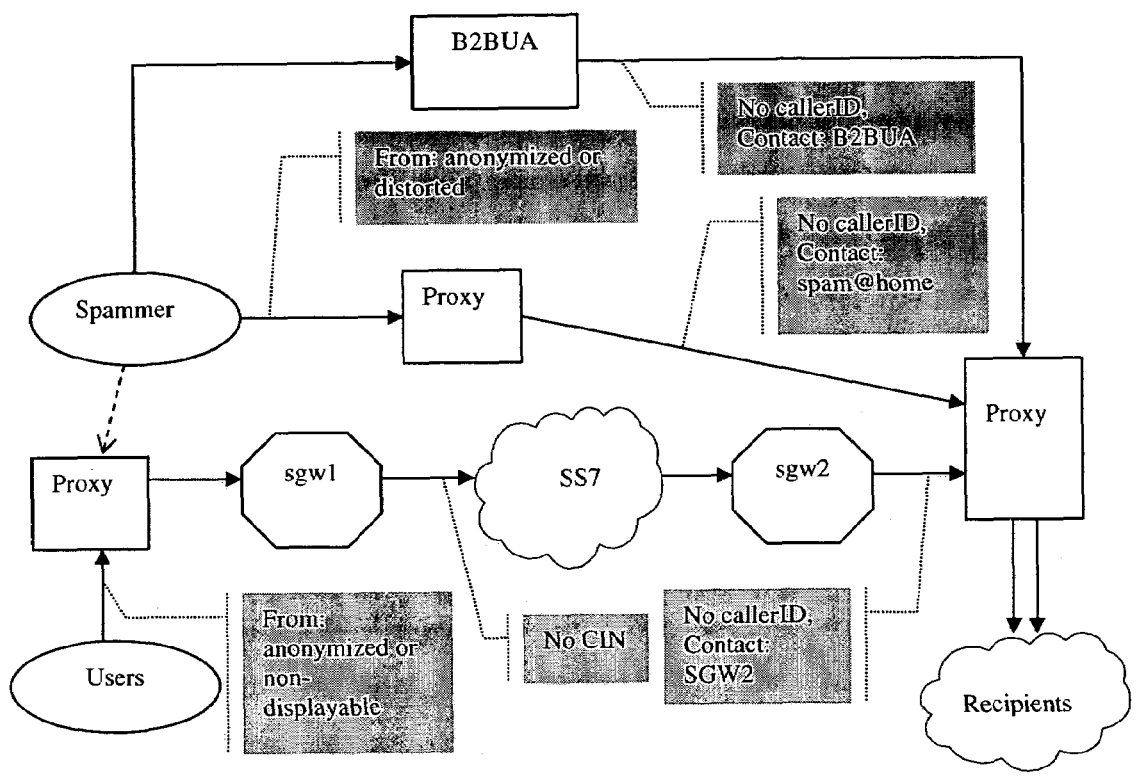
Figure 1: General Topology for SIP

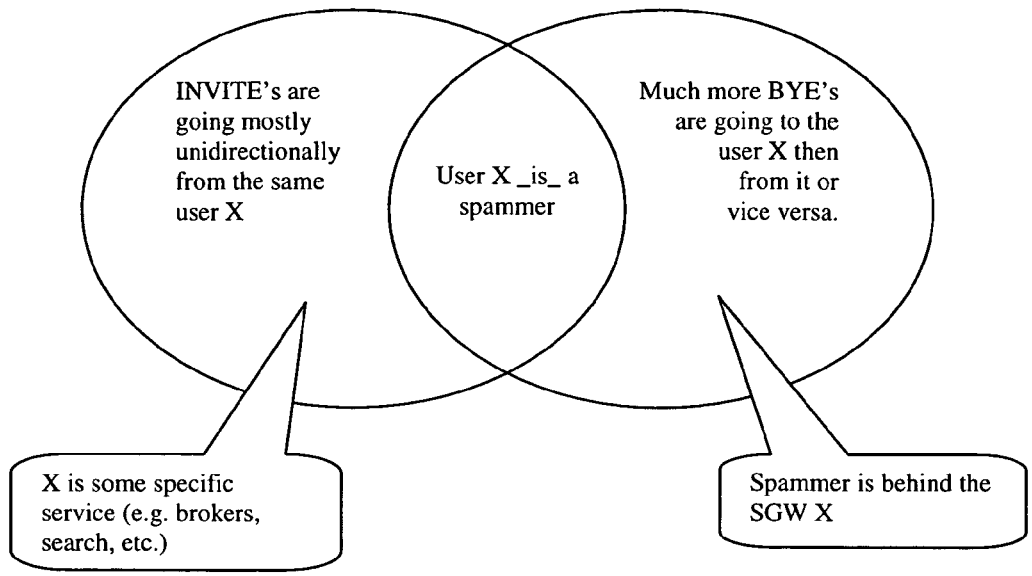
Figure 2: Events Map
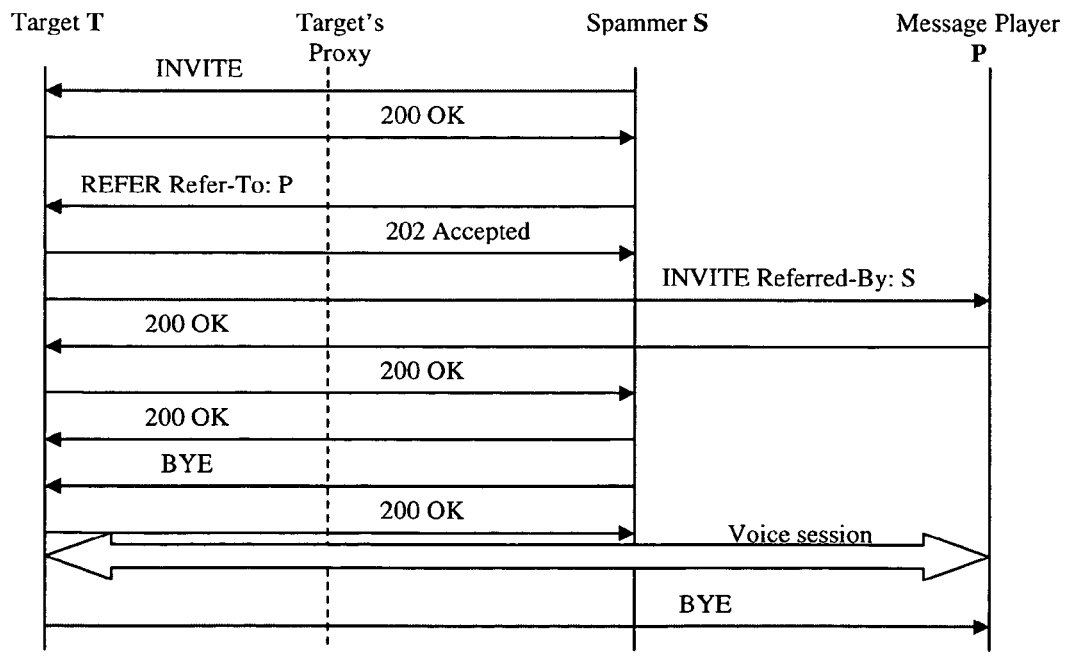
Figure 3: Spam re-originated from the different location

DETECTION AND MITIGATION OF UNWANTED BULK CALLS (SPAM) IN VOIP NETWORKS

FIELD OF THE INVENTION

This invention relates to interactive communication services, such as voice over IP (VoIP), and more particularly to methods and systems for detecting and mitigating unsolicited sessions through such services.

BACKGROUND

The global universality of the Internet Protocol (IP) has provided the incentive to make available to end users an ever increasing range of communication related services. These services include interactive communications such as voice, video and interactive games. Of particular significance is the Session Initiation Protocol (SIP) which has enabled the delivery of a wide range of enhanced telephony services. Through such telephony services end users can obtain the convergence of data and voice using packet telephony. These include an IP telephony (IPT) and multimedia application which provides IP based telephony services (voice, video and data) between two native IP terminals, or between an IP terminal and a normal POTs subscriber through an accessible IP gateway. The IPT applications can support black phones behind access gateways, residential gateways or integrated access devices. The IPT services both the residential and business markets and offers a wide range of managed VOIP-VPN services typically targeted at enterprise interconnection.

The long distance bypass (LDB), another telephony service, enables service providers to use packet based networks for basic long distance voice traffic thereby bypassing the traditional trunk, toll and international exchanges and optimizing voice transit costs.

Typically, such services are provided using a signalling proxy server, examples of such being Alcatel 5450 and Alcatel 5020.

Although VoIP promises significant cost savings and user convenience, without the introduction of proper controls it will be subject to abuse. It is well known that users of e-mail services over IP are constantly being bombarded with unsolicited correspondence known generally as Spam. Likewise, users of the ubiquitous PSTN are bothered with unsolicited telephone calls from Telemarketers, advertisers and the like. If left unchecked, unsolicited sessions such as telephone calls via VoIP will harm or even render impractical the service as businesses and consumers alike will react unfavorably to the service challenge.

E-mail and instant messaging (IM) are both subject, of course, to Spam but it can be controlled to some extent through filters which block or intercept certain messages. These filters provide a measure of protection as they are able to analyze text for its content before accepting or rejecting the correspondence. Such is not the case for voice messages, however, when it is impossible to predetermine the content of a future voice session.

Traditional voice networks employ services such as privacy detectors to deal with potentially annoying calls. An example of such a detector is a BellSouth Privacy Detector which can decrease the number of disruptive calls thereby giving consumers an increased sense of control, privacy and security within their own home. The Privacy Detector intercepts calls for which the caller's number is one of: blocked; private; unknown; or unavailable and requires those callers to identify themselves before their call can ring through on the customer's telephone. Another known system employs a "do not call" list that is used to identify recipients that do not wish to receive unsolicited calls from commercial organizations.

In connection with interactive communication sessions including VoIP, an entity attempting to make an unsoliciting call known herein as a spammer, can adopt Spam techniques developed to automatically generate unsolicited VoIP phone calls, video session, chat sessions for commercial or even elicit purposes. The difficulty in detecting and controlling the impact of VoIP Spam is compounded by the fact that VoIP Spam initiators may be different from the source of the Spam content such as pre-recorded messages, call center or call sales offices being delivered to the target. The Spam source may also use a VoIP Spam initiator or a network of Spam initiators to initiate those calls on their behalf. These VoIP initiators could include compromised systems running Trojan software that are under the control of a spammer. All of these factors make it difficult to distinguish between legitimate VoIP and VoIP Spam.

There are essential distinctions that make the methods of detection and prevention of e-mail and IM spam not applicable to VoIP spam. As stated previously it is practically impossible to analyze the content of a future voice session. Further, the automated "accept-reject" decision must be made in real time in most of cases. "Accept" decision here means immediate delivery of the call directly to the recipient's terminal device including message servers, email servers or Instant messenger service.

Identification of the originator may be misleading in VoIP networks as the actual spam sender's identity may be anonymized and as a result, the recipient might see the identity of a legitimate signaling gateway as a call originator which it really could be in other legitimate scenarios.

Telephone number cannot be changed as often as temporarily assigned web-based e-mail addresses, so the assumption that a telephone number is public or known to the spammer must be made, i.e. in general for detection it is not possible to rely on setup failure reports resulting from the fact that recipients do not exist.

SUMMARY OF THE INVENTION

The present invention provides a mechanism to detect unsolicited signaling behavior and mitigation techniques to control the delivery of VoIP Spam. These mechanisms are based on the analysis of multimedia signaling protocol messages that negotiate call set-up and control functions.

Generally, the invention provides a technique for detecting SPAM calls in VoIP networks and taking responsive actions to such calls. Detection is based on recognizing abnormalities in signaling message statistics. For example, a device that persistently sends many more call setup requests then it receives and at the same time constantly receives too many, or too few, call terminations in a statistically determined period of time is assumed to be a spam source. This criteria is based on the principle that a Spammer originates many calls, which are consistently terminated by the Spammer or the recipient. Responsive actions to the detection of VoIP spam include displaying a call text warning to the recipient, using special ring tone, automated voice mail answer, rejecting the call, etc. The invention addresses an issue that will become more problematic for VoIP networks and their subscribers in the future, and to which a solution has not been proposed in the prior art.

Therefore, in accordance with a first aspect of the invention there is provided a method of mitigating unsolicited calls in a VoIP network, comprising the steps of: a) collecting statistics on incoming and outgoing call setup and termination signaling message types on a per user basis in a given time period; b) comparing the total of the incoming messages to the outgoing messages of each setup and termination message type for a given user; and c) responsive to a statistically significant imbalance in the comparison of both types of message statistics for the given user, taking an action to mitigate unsolicited calls from that user.

In accordance with a second aspect of the invention there is provide a system for mitigating unsolicited calls in a VoIP network, comprising: providing means for collecting statistics on incoming and outgoing call setup and termination signaling message types on a per user basis in a given time period; providing means for comparing the total of said incoming messages to said outgoing messages of each setup and termination message type for a given user; and means, responsive to a statistically significant imbalance in the comparison of both types of message statistics for the given user, for taking an action to mitigate unsolicited calls from that user.

BRIEF DESCRIPTION OF THE DRAWINGS

The invention will now be described in greater detail having reference to the attached drawings wherein:

FIG. 1 illustrates an example topology for SIP deployments with an indication of possible ways spam and legitimate messages may traverse the system;

FIG. 2 represents an example event map illustrating the differentiation of spam and legitimate scenarios; and FIG. 3 illustrates an example scenario for re-originating spam media from another location identified as a message player.

DETAILED DESCRIPTION OF THE INVENTION

FIG. 1 illustrates an example topology for a session initiation protocol (SIP) deployment architecture. This figure illustrates a number of possible scenarios for a spammer to direct calls to the recipient group. As shown a spammer using a proxy server can call directly to the proxy server at the edge of the recipient or targeted network. In this case the spammer's identity may be anonymized or distorted so as not to provide a true caller identification.

Using a B2BUA a spammer is able to invoke privacy measures to avoid providing identifier information. A further scenario is one in which spammer's call is routed through the PSTN, in which case the caller may be identified by an intermediate signaling gateway ID.

The solution that is proposed here is based on the statistical characteristics of the VoIP signaling messages when a spamming scenario occurs. In one common scenario a Spammer is the one who initiates the calls to the targeted network, but almost nobody initiates calls to back to the Spammer. A second distinguishing characteristic of a Spammer is that a voice spam call is consistently terminated by the spam recipient (i.e. the call recipient is the originator of the session terminating signaling message) as in the cases when pre-recorded voice message is used or when spammer's goal is to be persistent with each recipient.

Alternatively, the voice spam call is constantly terminated by the spam originator in the cases when the spammer's first task is to quickly define whether his call's counterpart is of his potential interest and the conversation has any perspective for the spammer. Since in this case spammer tries to reach as many people as possible he tries to save his time, and since most of recipients do not eventually demonstrate their interest in the topic, the spammer terminates the call immediately to contact another recipient.

The Spammer does not call back the same recipient in a reasonable time.

In the above examples of Spamming scenarios, signaling patterns can be detected which lead to the proposed solutions provided by the present invention.

Thus, according to the invention the basic idea for spammer detection is that one who persistently sends many more call setup requests then he receives and at the same time constantly receives too many or too few call termination requests versus the total number of termination requests in the calls with this particular user's participation in a given period of time, is assumed to be a spam source. The detection engine may be deployed on the targeted network edge signaling proxy and the signaling messages outgoing from the proxy in either direction (towards the targeted access network or to the external network) may be counted.

Once an incident of spamming has been detected the reaction of a service provider will be important in mitigating the unsolicited calls to the service provider's customers. Several mitigating solutions are contemplated depending on circumstances. For example, a simple solution may involve providing a warning to a call recipient. This warning could be to display a text warning on the recipient's phone or a special ringing tone might be provided.

As unsolicited calls using VoIP may originate in very different time zones such that are received during the night special ringing tones may be annoying to the recipient. In these circumstances other solutions may be preferable such as delaying the call by switching automatically to the recipient's voice mail or ignoring the call and reporting it later as a missed one.

Alternatively the call could be rejected and the call setup cancelled on behalf of recipient.

Under some conditions, the identity of the actual spam initiator cannot be determined by the recipient or by his Service Provider. For instance, in the SIP (Session Initiation Protocol) case, a spammer may legitimately hide his identity behind Signaling Gateway or B2BUA (FIG. 1). Neither From: nor Contact: header fields can be used for spammer identification if he applies special anonymization technique. Under these techniques the ID of B2BUA or SGW will be presented as described in greater detail in. "*A Privacy Mechanism for the SIP*", IETF RFC 3323 and "*ISUP to SIP mapping*", IETF RFC 3398. Moreover, the SGW ID in this case must be differentiated from the spammer's ID since the recipient's Proxy cannot know all the SGW names in the world in advance.

There follows examples of statistical metrics being calculated on a per host (or per user) basis for SIP signaling protocol. Since the spammers are interested in completing the call setups and do not perform DoS attacks, it is assumed that Contact: and Via: header field values are correct.

Let $INV_X\rightarrow$ represent the number of INVITEs (incoming call set up messages) that have URI X in the Contact: header field and that were passed to the access (targeted) network in a given time.

Let $INV_X\leftarrow$, $BYE_X\leftarrow$—number of INVITEs and BYEs (outgoing call termination messages) that have URI X in the method line and that were passed to the external network in the given time. All these outgoing INVITEs must not contain Referred-By: header field, i.e. must be originated by the sender. Let $BYE_X\rightarrow$—number of BYEs that have URI X in the From: header field and that were passed to the access (targeted) network in the given time The imbalance in the number of incoming and outgoing INVITEs and BYEs can be estimated statistically. We assume there are not less then 20 INVITEs and BYEs passed through the detector and that the direction of each INVITE going through the Proxy is a binomial variate with the probability 0.5 (which could be correspondingly adjusted according to the specific local conditions), the sum of this variates can be approximated by Normal Distribution:

$$I = (INV_X\rightarrow - INV_X\leftarrow)/(INV_X\rightarrow + INV_X\leftarrow)^{1/2} \sim N(0,1)$$

$$B = (BYE_X\leftarrow - BYE_X\rightarrow)/(BYE_X\rightarrow + BYE_X\leftarrow)^{1/2} \sim N(0,1)$$

If, for instance, the reliability of detector is set to 0.9999, the alarm will be issued in case when both I>3.7 and |B|>3.8 (as per the quantities of the standard Normal Distribution). Absolute value of B is needed here to cover both direction cases of unilaterally flowing BYE messages.

FIG. 2 illustrates the rationale for combination of these events.

The direct source of spam media content and the initiator(s) of VoIP spam session could be separated and they could be located in different networks (countries, enterprises, etc.) as in the SIP scenario shown in the FIG. 3 for the cases when the SIP phone is the user's terminal device. The metrics proposed earlier will not work for detection of either spam initiator or actual voice spam session participants in such cases. To tackle this scenario the metrics may be adjusted as follows. It is assumed that end-user terminal devices ignore the SIP REFER message if it happens outside of existing active dialog, or it may not support REFER method at all (method disabled or not SIP-enabled end-user device). First, each incoming REFER message with URI X in the From: header field must decrease $BYE_X\rightarrow$ by one to keep the original statistics B intact. To detect the actual spam source, the same approach as above may be applied again for R and B statistics:

$$R = (REF_P\rightarrow - INV_P\leftarrow)/(REF_P\rightarrow + INV_P\leftarrow)^{1/2} \sim N(0,1)$$

where $REF_P\rightarrow$—the number of REFERs that have URI P in the Refer-To: header field and that were passed to the access (targeted) network in the given time $INV_P\leftarrow$ is the same as earlier. As a second stage, the sources detected as generating significant amount of SIP requests referring to the address that has already been detected as a source of spam voice sessions could be treated as spammers.

The ways to react to a detected spam event that are proposed herein do not imply by any means the rejection of traditional or rather obvious ways to detect or prevent spam. Some of these way include: black and white lists; rejecting anonymous calls; and DoNotCall VoIP recipients' registries. Also a list might be prepared which would include an abnormally high number of setup failure reports identifying a spammer who does not know the recipients' identities (phone numbers, IP addresses) and looks through and tries some subspace of the potential recipient IDs.

After the spam source is detected and proposed reactive measures (recipients warning, call delay, call reject) are taken it is expected that there would be fewer BYE messages caused by spam voice sessions. In this case, BYE-based metrics will not work.

To continue tracking the spam activity from the identified spam source and for keeping the reactive measures activated, it would be necessary to rely on statistics I and R only for this particular source. Reactive measures may be deactivated either after I and R come back to the "no-alarm" values, after some period of time or by operator command.

The solution proposed here presents a defensive approach against unsolicited calls (spam, telemarketing) in VoIP networks. It is applicable to deployment on both enterprise gateways and access network signaling gateways (proxies).

The solution has the following advantages:—it relies entirely on local targeted network features and local Service Provider's policy;—it analyses signaling messages only, not actual media flows; and the method does not imply end users' collaboration or any upgrade of user's terminal devices While particular embodiments of the invention have been described and illustrated it will be apparent to one skilled in the art that numerous changes can be made to the basic concept. It is to be understood, however, that such changes will fall within the full scope of the invention as defined by the appended claims.

We claim:

1. A method of mitigating unsolicited calls in a VoIP network, comprising the steps of:
   a) collecting statistics on incoming and outgoing call setup and termination signalling message types on a per user basis in a given time period;
   b) comparing the total of said incoming messages to said outgoing messages of each setup and termination message type for a given user; and
   c) responding to a statistically significant imbalance in the comparison of both types of message statistics for the given user, taking an action to mitigate unsolicited calls from that user.

2. The method as defined in claim 1 wherein the statistics are collected by a signaling proxy server for voice over Internet protocol (VoIP).

3. The method as defined in claim 2 wherein the unsolicited calls are voice, video or chat sessions.

4. The method as defined in claim 1 wherein the unsolicited calls are initiated using a Session Initiation Protocol (SIP).

5. The method as defined in claim 4 wherein a user is able to hide its identity.

6. The method as defined in claim 4 wherein a user identity is masquerading behind the identity of an intermediate node such as a signaling gateway.

7. The method as defined in claim 1 wherein the action to mitigate unsolicited calls from a user could be to provide a recipient with a warning including displaying a text warning or providing a special ringing tone.

8. The method as defined in claim 1 wherein the action to mitigate calls from a user is to re-direct the call by switching to a recipient's voice mail.

9. The method as defined in claim 1 wherein the action to mitigate calls from a user is to reject the call and cancel the call set up on behalf of the recipient.

10. A system for mitigating unsolicited calls in a VoIP network, comprising:

providing means for collecting statistics on incoming and outgoing call setup and termination signaling message types on a per user basis in a given time period;

providing means for comparing the total of said incoming messages to said outgoing messages of each setup and termination message type for a given user; and means, responding to a statistically significant imbalance in the comparison of both types of message statistics for the given user, for taking an action to mitigate unsolicited calls from that user.

11. The system as defined in claim 10 wherein the means for collecting, comparing and taking action are associated with a signaling entity such as a proxy server.

12. The system as defined in claim 11 wherein the unsolicited calls are made using the Session Initiation Protocol (SIP).

* * * * *